United States Patent Office 3,184,457
Patented May 18, 1965

3,184,457
2-AMINOBENZOFURAN(2H)-5-OLS AND A
PROCESS OF MAKING THEM
Kent C. Brannock and Herman S. Pridgen, Kingsport, Tenn., assignors to Eastman Kodak Company, Rochester, N.Y., a corporation of New Jersey
No Drawing. Filed Feb. 12, 1963, Ser. No. 257,873
10 Claims. (Cl. 260—247.7)

This invention relates to novel organic compounds and more particularly to 2-aminobenzofuran(2H)-5-ols and to a process for preparing them. This application is a continuation-in-part of our co-pending application Serial No. 38,725, filed June 27, 1960 now abandoned.

We have found that when an enamine of the formula:

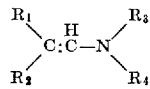

is treated with a quinone of the formula:

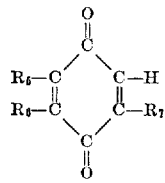

they react to give a novel 2-aminobenzofuran(2H)-5-ol of the formula:

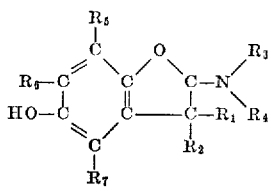

In the above formulae the substituents $R_1$ through $R_7$ are as follows.

$R_1$, taken singly, is hydrogen or alkyl, preferably lower alkyl; $R_2$, taken singly, is alkyl, preferably lower alkyl; and $R_1$ and $R_2$, taken collectively, are joined bivalent hydrocarbon groups which with the carbon atom to which they are attached form a fully hydrogenated hydrocarbon ring of 3 to 10, and preferably 4 to 6, ring members.

$R_3$ and $R_4$, taken collectively, are joined bivalent organic groups which with the nitrogen atom to which they are attached form a fully hydrogenated heterocyclic ring of 3 to 10, and preferably 4 to 6, ring members, such as piperidino, morpholino, thiamorpholino, or pyrrolidinyl. Taken singly, $R_3$ and $R_4$ are alkyl groups, preferably lower alkyl.

$R_5$, $R_6$ and $R_7$, taken singly, are selected from the group consisting of hydrogen, mononuclear aryl, and lower alkyl. Taken collectively, $R_5$ and $R_6$ represent joined bivalent organic radicals that form a fused ring with the quinone ring, as in naphthoquinone.

By "alkyl" we mean to include alkyl groups having up to about 18 carbon atoms and by "lower alkyl" we mean alkyl groups of 1 to about 7 carbon atoms, such as methyl, ethyl, propyl, isobutyl, n-pentyl, n-hexyl, 2-methylpentyl, 2,2-dimethylpentyl and the like.

Enamines of the above formula are available from the reaction of a secondary amine with an aliphatic aldehyde having at least one α-hydrogen.

Our invention is illustrated by the following examples.

Example 1

To a slurry of quinone (5.4 g., 0.05 mole) in 50 ml. of benzene a solution of N,N-dimethyl isobutenylamine (5 g., 0.05 mole) in 25 ml. of benzene was added at such a rate that, with moderate cooling the temperature was maintained at 40–50° C. The reaction mixture was then allowed to stand overnight at room temperature. The solid product was removed by filtration, and purified by recrystallization from benzene to give 5 g. (48 percent yield) of pure 2-dimethylamino-3,3-dimethyl-benzofuran (2H)-5-ol, M.P. 155–157° C. *Analysis.*—Found: 69.65% C, 8.03% H, 6.69% N. Theoretical: 69.53% C, 8.26% H, 6.76% N.

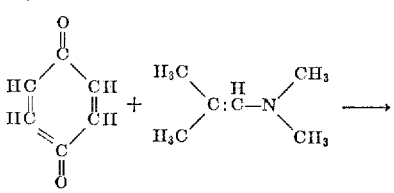

Quinone    N,N-dimethyl isobutenylamine

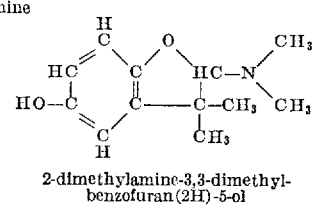

2-dimethylamino-3,3-dimethyl-benzofuran(2H)-5-ol

Example 2

In a manner similar to that described in Example 1, quinone and 1-piperidino-isobutene gave 2-piperidino-3,3-dimethylbenzofuran(2H)-5-ol, M.P. 164–165° C., in good yield. *Analysis.*—Found: 72.56% C, 8.58% H, 5.62% N. Theoretical: 72.84% C, 8.56% H, 5.66% N.

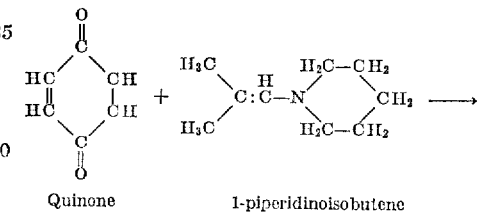

Quinone    1-piperidinoisobutene

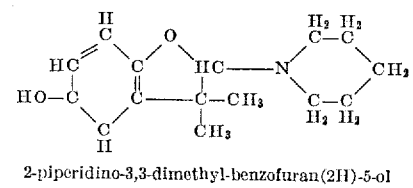

2-piperidino-3,3-dimethyl-benzofuran(2H)-5-ol

Example 3

A solution of 1-piperidino-isobutene (69.5 g., 0.5 mole) in 150 ml. of hexane was added dropwise to a solution of tert-butyl-quinone (82 g., 0.5 mole) in 250 ml. of hexane at such a rate as to maintain a temperature of 40–45° C. with slight external cooling. The mixture was then heated under reflux (68–70° C.) for two hours. The solvent was then removed by evaporation, and the solid residue was triturated with pentane to give 105 g. of product (69%), M.P. 127–129° C. The product is 2-piperidino-3,3-dimethyl-tert-butyl-benzofuran(2H)-5-ol. It is not certain whether the tert-butyl group is in the 6- or the 7-position.

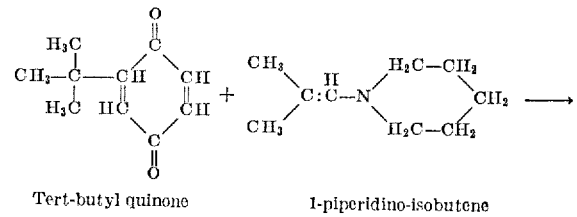

Tert-butyl quinone    1-piperidino-isobutene

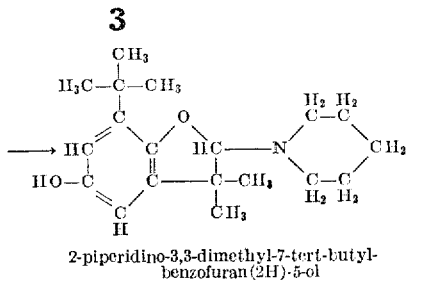

2-piperidino-3,3-dimethyl-7-tert-butyl-
benzofuran(2H)-5-ol

Example 4

In a manner similar to that of Example 1, quinone and piperidino-methylenecyclohexane (B.P. 75–88° C. at 1.5-3 mm., $n_D^{20}$ 1.5042, prepared from piperidine and cyclohexanecarboxaldehyde by the method described by Benzing in Angew. Chem. 71, 521 (1959), abstracted in Chem. Abstr. 54, 6751b (1960), gave 2-piperidino-spiro[benzofuran-3-(2H),1'-cyclohexan]-5-ol. This compound, after recrystallization from a mixture of benzene and hexane, melted at 143–145° C.

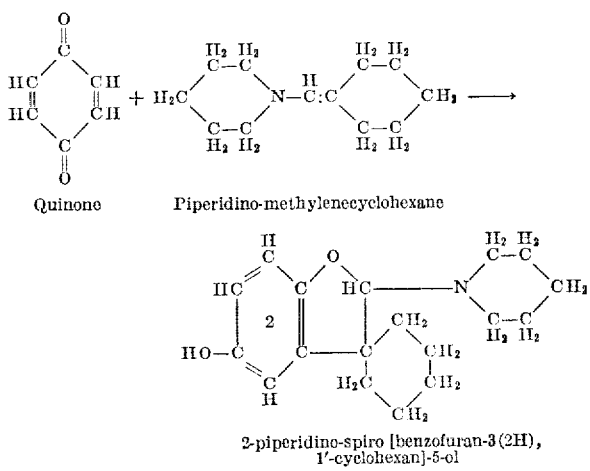

Example 5

In a like manner, quinone and N-isobutenyl morpholine gave 2-morpholino-3,3-dimethyl-benzofuran(2H) - 5 - ol, M.P. 187–191° C.

Example 6

In a like manner, phenylquinone and N,N-dimethylisobutenylamine gave phenyl-2-dimethylamino-3,3-dimethylbenzofuran(2H)-5-ol, M.P. 125–128° C. The position of the phenyl group is not known with certainty.

The following examples illustrate preparations in accordance with the invention wherein $R_1$ is hydrogen.

Example 7

In a manner similar to that described in Example 1 p-benzoquinone and N-(1-butenyl)piperidine gave an 87% yield of 2,3-dihydro-3-ethyl-2-piperidino-5-benzofuranol, M.P. 173–5°.

Example 8

In a like manner, p-benzoquinone and N,N-diethyl-1-butenyl amine gave a liquid product, 2,3-dihydro-3-ethyl-2-diethylamino-5-benzofuranol in 60% yield, B.P. 143–6° at 1.5 mm., $n_D^{20}$ 1.5380.

Example 9

In a like manner, p-benzoquinone and N-(1-heptenyl)-morpholine gave 96% yield of 2,3-dihydro-3-amyl-2-morpholino-5-benzofuranol, M.P. 83–84.5°.

Other enamines, such, for instance, as 1-piperidino-2-ethyl-1-butene, may be used. Other quinones, such as toluquinone and 1,4-naphthoquinone may be used.

Our novel compounds are useful as antioxidants for gasoline, fats and oils, and polymeric compositions.

The compounds of the invention are also useful as chemical intermediates for the production of other valuable compounds. The new compounds contain the characteristic group:

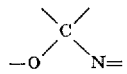

and undergo reactions similar to those of acetals. For example, as illustrated by the examples hereinafter, they can be converted to useful aldehydes, although not so easily as the simple acetals because of the stability imparted by the hydrofuran ring system.

Example 10

Benzoyl chloride (3 g., 0.021 mole) was added to 2,3-dihydro - 3,3 - dimethyl-2-piperidino-5-benzofuranol (2.5 moles) in 10 ml. of pyridine and the mixture was heated on the steam bath for 20 minutes. Saturated aqueous sodium bicarbonate solution (50 ml.) was added to the mixture which was then filtered. The solid obtained was recrystallized from aqueous ethyl alcohol to give 1.5 g. (39% yield) of (1-formyl-1-methylethyl)hydroquinone dibenzoate, M.P. 146–147°. Analysis showed 74.2% carbon and 5.5% hydrogen as compared with theoretical values of 74.2 and 5.2 respectively.

Example 11

Similar treatment of 2-dimethylamino-2,3-dihydro-3,3-dimethyl-5-benzofuranol gave the same aldehyde as in Example 10 in 51% yield. This aldehyde has been found to be effective as an analgesic and useful as an intermediate for pharmaceuticals.

The invention has been described in considerable detail with particular reference to certain preferred embodiments thereof, but it will be understood that variations and modifications can be effected within the spirit and scope of the invention as described hereinabove, and as defined in the appended claims.

We claim:

1. A process of preparing 2-aminobenzofuran(2H)-5-ols which comprises reacting a quinone having the formula:

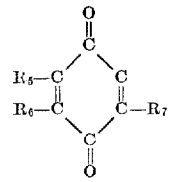

with an enamine having the formula:

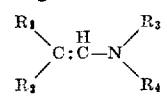

in which:
- $R_1$, taken singly, is selected from the group consisting of hydrogen and alkyl of up to 18 carbon atoms;
- $R_2$, taken singly, is alkyl of up to 18 carbon atoms;
- $R_1$ and $R_2$, taken collectively, are bivalent hydrocarbon which together with the carbon atom to which they are attached form a fully hydrogenated hydrocarbon ring of 3 to 10 ring members;
- $R_3$ and $R_4$, taken singly, are alkyl of up to 18 carbon atoms and, taken collectively, are bivalent groups which together with the nitrogen atom to which they are attached form a fully hydrogenated heterocyclic ring selected from the group consisting of piperidino, morpholino, thiamorpholino, and pyrrolidinyl;
- $R_5$, $R_6$ and $R_7$, taken singly, are selected from the group consisting of hydrogen, phenyl and alkyl of up to 18 carbon atoms; and
- $R_5$ and $R_6$, taken collectively, are the atoms necessary to complete the fused ring of naphthoquinone.

2. A 2-aminobenzofuran(2H)-5-ol having the formula:

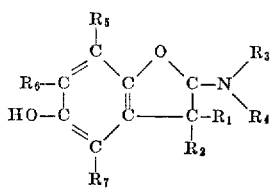

in which:

$R_1$, taken singly, is selected from the group consisting of hydrogen and lower alkyl;

$R_2$ taken singly, is lower alkyl;

$R_1$ and $R_2$, taken collectively, are bivalent hydrocarbon which together with the carbon atom to which they are attached form a fully hydrogenated hydrocarbon ring of 3 to 10 ring members;

$R_3$ and $R_4$, taken singly, are alkyl and, taken collectively, are bivalent groups which together with the nitrogen atom to which they are attached form a fully hydrogenated heterocyclic ring selected from the group consisting of piperidino, morpholino, thiamorpholino, and pyrrolidinyl;

$R_5$, $R_6$ and $R_7$, taken singly, are selected from the group consisting of hydrogen, phenyl and alkyl; and $R_5$ and $R_6$, taken collectively, are the atoms necessary to complete the fused ring of naphthoquinone.

3. The compound 2-dimethylamino-3,3-dimethylbenzofuran(2H)-5-ol, having a melting point of 155–157° C.

4. The compound 2-piperidino-3,3-dimethylbenzofuran(2H)-5-ol, having a melting point of 164–165° C.

5. The compound 2-piperidino-3,3-dimethyl-tert-butylbenzofuran(2H)-5-ol, having a melting point of 127–129° C.

6. The compound 2 - piperidino - spiro[benzofuran - 3(2H),1'-cyclohexan]-5-ol, having the melting point 143–145° C.

7. The compound 2-morpholino-3,3-dimethyl-benzofuran(2H)-5-ol, having the melting point 187–191° C.

8. The compound 2,3-dihydro-3-ethyl-2-piperidino-5-benzofuranol, having a melting point of 173–175° C.

9. The compound 2,3-dihydro-3-ethyl-2-diethylamino-5-benzofuranol, having a boiling point of 143–146° C. at 1.5 mm. Hg.

10. The compound 2,3-dihydro-3-amyl-2-morpholino-5-benzofuranol, having a melting point of 83–84.5° C.

No references cited.

IRVING MARCUS, *Primary Examiner.*

NICHOLAS S. RIZZO, *Examiner.*